Aug. 11, 1942.　　　W. WILSON　　　2,292,557
WOOD SCREW
Filed Sept. 25, 1941
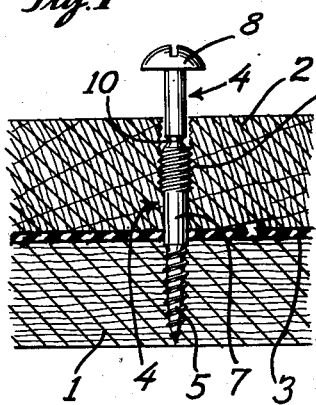
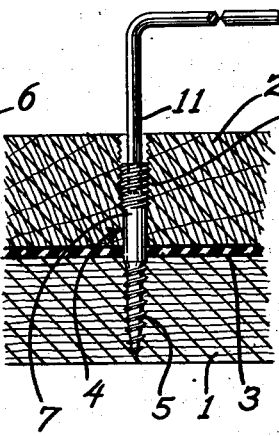
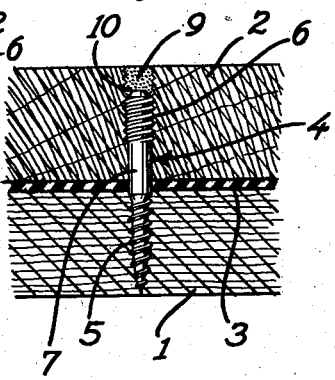
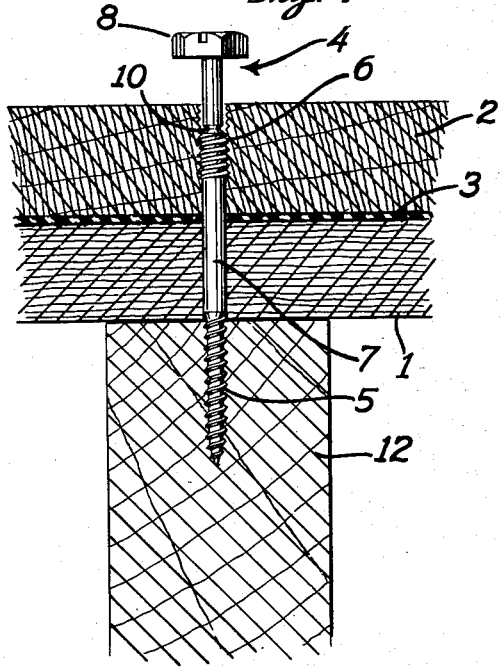
INVENTOR.
Wesley Wilson
BY Thiess, Olsen & Mecklenburger
Attys.

Patented Aug. 11, 1942

2,292,557

UNITED STATES PATENT OFFICE 2,292,557

WOOD SCREW

Wesley Wilson, Chicago, Ill.

Application September 25, 1941, Serial No. 412,236

1 Claim. (Cl. 85—41)

My invention relates to wood screws.

One of the objects of my invention is to provide a wood screw which can be used to take the squeak out of a floor or sheathing construction, or the like.

A further object is to provide a wood screw which can be used to secure and clamp an outer floor or sheathing snugly in place.

A further object is to provide such a construction in which the securing and clamping screw may be concealed.

Further objects and advantages of the invention will be apparent from the description and claim.

In the drawing, in which several embodiments of my invention are shown,

Figure 1 is a sectional view through a floor construction, the screw being shown in elevation;

Fig. 2 is a sectional view through a flooring showing another form of screw;

Fig. 3 is a sectional view showing the upper part of the screw shown in Figure 1 broken off and covered; and Fig. 4 is a sectional view showing a flooring and support with the securing screw shown in elevation.

Referring to the drawing in detail, and first to Figs. 1 and 3, the construction shown comprises an inner flooring or base 1 which may be of relatively soft wood, an outer flooring or sheathing 2 which may be of relatively hard wood, a layer 3 of compressible cushioning material between the two layers of flooring, and a securing and clamping screw 4. The securing and clamping screw comprises a relatively small diameter, relatively coarse pitch, tapering, threaded point 5 for entry into threaded engagement with the inner flooring 1, and a relatively large diameter, relatively fine pitch, threaded portion 6 for entry into threaded engagement with the outer flooring 2. The screw has a shank portion 7 of substantial length between the threaded portions to enable the pointed, tapering, threaded portion 5 to enter into substantial engagement with the inner flooring 1 before the fine pitch, threaded portion 6 enters into threaded engagement with the outer flooring 2. The screw has a head 8 extending above the floor line and having a weakened connection with the threaded portion 6 of the screw below the floor line to enable the head and upper portion of the shank to be broken off when the outer flooring 2 is securely clamped in place as shown in Fig. 3. After the screw is in place, as shown in Fig. 3, the hole in the outer flooring above the threaded portion 6 of the screw may be filled with a wood filler 9 to cover the screw.

In use, a hole may be first drilled through the outer flooring and cushioning layer and into the inner flooring. The drill may be so shaped that the outer portion of the hole drilled will be of somewhat larger diameter than the inner portion. The diameter of the inner part of the hole may be about the same diameter as the root diameter of the threaded point of the screw 5, and the outer part of the hole may have a diameter about equal to the root diameter of the threaded portion 6 of the screw. The screw is then inserted and screwed down by means of a screw driver engaging the head 8. The first part of the rotational movement of the screw will cause the point of the screw to thread down into the inner flooring until the large diameter threaded portion 6 begins to engage the outer portion of the hole. When this outer portion begins to bite into the outer hardwood flooring, further rotation of the screw will tend to draw the inner and outer floorings together, due to the difference in pitch of the two threaded portions 5 and 6 of the screw. When the floorings are clamped tightly together, further rotation of the screw driver will break off the head of the screw at the weakened portion 10, as shown in Fig. 3. The hole above the screw may then be filled with a wood filler 9.

The construction shown in Fig. 2 is substantially the same as that shown in Figs. 1 and 3 except that here the upper end of the screw is provided with a wrench-engaging socket for engagement with the noncircular end of a wrench 11. In this form the head of the screw will completely enter the hole in the hardwood flooring and may be screwed somewhat below the upper surface as shown.

The construction shown in Fig. 4 is substantially like that shown in Figs. 1 and 3 except that here the point 5 of the screw enters a floor supporting member 12, such as a joist, and the threaded portion 6 of the screw does not enter into threaded engagement with the inner flooring 1. The outer large diameter threaded portion engages the hardwood outer flooring or sheathing 2 just as shown in Figs. 1 and 3. In this form, both the inner flooring 1 and the cushioning layer 3 are clamped between the joist 12 and the outer hardwood flooring 2. The head of the screw may be broken off and the space above the screw filled just as shown in Fig. 3.

Screws such as shown might be used in tightening up and taking the squeak out of the hardwood flooring or for securing and tightening up sheathing in boats or, in general, in any place where it is desired to secure an outer wooden finishing layer onto an inner wooden base.

Further modifications will be apparent to those skilled in the art and it is desired, therefore, that the invention be limited only by the scope of the appended claim.

Having thus described my invention, what I claim and desire to secure by Letters Patent is:

A clamping wood screw having a shank comprising a tapered end portion having a thread of relatively high pitch for threaded engagement with an inner layer, a rearward portion having a thread of relatively low pitch for threaded engagement with an outer layer, and an intermediate unthreaded portion of substantial length separating the two threaded portions, said screw having a head located a substantial distance above the outer surface of the finishing layer when the layers have been clamped snugly together by the screw and having a weakened connection with the shank of the screw a substantial distance below the outer surface of the finishing layer when the layers have been clamped snugly together by the screw, which is broken by continued turning movement when the two threaded portions have drawn the two layers snugly together.

WESLEY WILSON.